(12) United States Patent
Balfe et al.

(10) Patent No.: US 9,808,759 B2
(45) Date of Patent: Nov. 7, 2017

(54) CARBON CAPTURE SYSTEM AND METHOD FOR CAPTURING CARBON DIOXIDE

(71) Applicant: ALSTOM Technology Ltd, Baden (CH)

(72) Inventors: Michael Charles Balfe, Mainz (DE); Olaf Stallmann, Essenheim (DE); Christoph Weingärtner, Gau-Algesheim (DE)

(73) Assignee: General Electric Technology GmbH, Baden (CH)

( * ) Notice: Subject to any disclaimer, the term of this patent is extended or adjusted under 35 U.S.C. 154(b) by 45 days.

(21) Appl. No.: 14/726,916

(22) Filed: Jun. 1, 2015

(65) Prior Publication Data

US 2015/0343373 A1 Dec. 3, 2015

(30) Foreign Application Priority Data

Jun. 2, 2014 (EP) .................................... 14170724

(51) Int. Cl.
*B01D 53/02* (2006.01)
*B01D 53/62* (2006.01)
(Continued)

(52) U.S. Cl.
CPC ............ *B01D 53/62* (2013.01); *B01D 53/73* (2013.01); *B01D 53/81* (2013.01); *B01D 53/83* (2013.01); *C04B 7/367* (2013.01); *B01D 53/08* (2013.01); *B01D 53/96* (2013.01); *B01D 2251/404* (2013.01); *B01D 2251/602* (2013.01); *B01D 2257/504* (2013.01); *B01D 2258/0283* (2013.01); *B01D 2259/65* (2013.01);
(Continued)

(58) Field of Classification Search
CPC ........ B01D 2251/404; B01D 2251/602; B01D 2257/504; B01D 2258/0283; B01D 2259/65; B01D 53/08; B01D 53/62; B01D 53/73; B01D 53/81; B01D 53/83; B01D 53/96; C04B 7/367; Y02C 10/04; Y02C 10/08; Y02P 40/18
See application file for complete search history.

(56) References Cited

U.S. PATENT DOCUMENTS 6,554,061 B2  4/2003  Jukkola et al.
2007/0032380 A1  2/2007  Anthony et al.
(Continued)

FOREIGN PATENT DOCUMENTS

WO      2012152899 A1   11/2012

*Primary Examiner* — Christopher P Jones
(74) *Attorney, Agent, or Firm* — GE Global Patent Operation; Cynthia W. Flanigan

(57) ABSTRACT

A carbon capture system includes a Carbonator for adsorbing carbon dioxide with a carbon dioxide lean sorbent generating a carbon dioxide rich sorbent, a first Calciner for thermally decomposing a carbon dioxide rich sorbent into a carbon dioxide lean sorbent and carbon dioxide, a supply of raw material to be calcined into the first Calciner containing a carbon dioxide rich sorbent, a connection between the first Calciner and the Carbonator, a second Calciner for thermally decomposing a carbon dioxide rich sorbent into a carbon dioxide lean sorbent and carbon dioxide, a connection between the Carbonator and the second Calciner, and a connection between the second Calciner and the Carbonator.

6 Claims, 3 Drawing Sheets

(51) Int. Cl.
  *B01D 53/81*  (2006.01)
  *B01D 53/73*  (2006.01)
  *B01D 53/83*  (2006.01)
  *C04B 7/36*  (2006.01)
  *B01D 53/08*  (2006.01)
  *B01D 53/96*  (2006.01)

(52) U.S. Cl.
  CPC ............... *Y02C 10/04* (2013.01); *Y02C 10/08* (2013.01); *Y02P 40/18* (2015.11)

(56) References Cited

U.S. PATENT DOCUMENTS

| | | | | |
|---|---|---|---|---|
| 2007/0092427 A1* | 4/2007 | Anthony | ................ | B01D 53/62 |
| | | | | 423/432 |
| 2009/0255444 A1 | 10/2009 | Martinez Vera | | |
| 2010/0086456 A1 | 4/2010 | Epple | | |
| 2011/0158874 A1 | 6/2011 | Smedley et al. | | |
| 2012/0164032 A1* | 6/2012 | Wormser | ................ | C10B 49/10 |
| | | | | 422/162 |
| 2014/0072484 A1* | 3/2014 | Gimenez | ................... | B01J 8/12 |
| | | | | 423/1 |

* cited by examiner

CARBON CAPTURE SYSTEM AND METHOD FOR CAPTURING CARBON DIOXIDE

CROSS-REFERENCE TO RELATED APPLICATIONS

This application claims priority to European application 14170724.0 filed Jun. 2, 2014, the contents of which are hereby incorporated in its entirety.

TECHNICAL FIELD

The present invention relates to a carbon capture system and method for capturing carbon dioxide.

Several systems and methods have been described previously which detail the capture of $CO_2$ from flue gas. These systems and methods can be integrated into different applications, such as into an industrial application or into a power plant to capture carbon dioxide from flue gas. Due to the rapid deactivation of natural sorbent materials, such as limestone, a preferred and particularly advantageous application of the present system and method are in connection with the production of low carbon content feed material for downstream cement clinker production, such as in a rotary kiln. While in the following description particular advantage of the proposed scheme for cement production is made, it is anyhow clear that the application of the system and method are not limited to cement production.

BACKGROUND

Cement production occurs by clinkering a raw material typically including limestone $CaCO_3$ (as a source of calcium oxide CaO), and clay, marl or shale (as source of $SiO_2$, $Al_2O_3$, $Fe_2O_3$) and typically also other materials such as sand.

A coupled carbon capture and cement production occurs over the following steps:
1) Sorbent preparation; material milling and heat-treatment, such as the calcination of limestone to produce CaO (allowing capture of the chemically associated $CO_2$ during calcination in the Calciner reactor);
2) Exposure of the sorbent powder to flue gas (possibly generated for the above mentioned heat treatment but also possibly from an external process) in order to convert CaO to $CaCO_3$ by lowering the concentration of $CO_2$ in the combustion flue gas through gas solid contact in the Carbonator reactor;
3) Regeneration of the sorbent materials, in particular the restoration of the $CO_2$ capture capacity (quantity $CO_2$/quantity sorbent);
4) A sorbent purge to close the material balance of the cycle and remove deactivated sorbent from the system which is utilized for cement production.

Considering the above steps, FIG. 1 shows a simplified block flow diagram representing a state of the art process scheme for cement production coupled with a carbon dioxide capture process. It includes a Calciner 1, a Carbonator 2 and a kiln 3. Raw material containing limestone $CaCO_3$ is supplied from a raw material supply 4 to the Calciner 1 where the make-up sorbent (mainly $CaCO_3$) is calcined (decomposed by heat) along with $CaCO_3$ from the Carbonator according to the reaction $$CaCO_3 \rightarrow CaO + CO_2$$

generating carbon dioxide $CO_2$ and carbon dioxide lean sorbent CaO. The lean sorbent CaO is supplied to the Carbonator 2 where carbon dioxide $CO_2$ is captured from flue gas 5 according to the carbonation reaction $$CaO + CO_2 \rightarrow CaCO_3.$$

Gas 6 deprived from carbon dioxide $CO_2$ is discharged from the Carbonator 2. The calcium carbonate $CaCO_3$ generated at the Carbonator 2 is supplied back into the Calciner 1 allowing the release of captured Carbon dioxide and sorbent regeneration.

The carbon containing flue gas 5 may be attributed to a variety of thermally driven processes, such as power generation but a quantity of the flue gas will always be attributed to the cement process. At the kiln 3 flue gas is generated by combustion of a fuel with air; in addition carbon dioxide $CO_2$ is released during the clinkering reactions due to the residual carbon content of the feed material leaving the Carbonator 2 on route to the Kiln 3.

FIG. 6 shows that after some adsorption/desorption cycles, the calcium oxide CaO loses its capacity to adsorb carbon dioxide $CO_2$; for this reason it must be purged.

According to the scheme of FIG. 1, purging is made by discharging calcined raw material containing calcium carbonate $CaCO_3$ from the Carbonator 2 and supplying it to the kiln 3 for calcination and thus clinkering.

As mentioned this scheme has the drawback that calcium carbonate $CaCO_3$ formed in the Carbonator is calcined at the kiln 3 which requires additional fuel combustion and produces additional $CO_2$ associated with the chemically bound $CO_2$ captured from the flue gas at the Carbonator 2. This causes an unnecessary carbon dioxide circulation between the Kiln and the Carbonator and consequently increased energy consumption and equipment dimensions and costs.

FIG. 2 shows a second simplified block flow diagram representing a state of the art process scheme for cement production. It is similar to the scheme of FIG. 1 and same numbers indicates same or similar components. The scheme of FIG. 2 differs from the scheme of FIG. 1 in that purging is made by discharging raw material containing calcium oxide CaO from the Calciner 1 and supplying it to the kiln 3.

This second scheme reduces the amount of circulating carbon dioxide, because a reduced amount of carbon dioxide is released at the kiln (because additional calcination of $CaCO_3$ associated with carbon dioxide captured from the flue gas is avoided); nevertheless fresh and highly active calcium oxide CaO (sorbent) that can be most efficiently used for carbon capture is purged unselectively together with deactivated or spent sorbent (i.e. sorbent that has a reduced capacity to adsorb carbon dioxide).

SUMMARY

An aspect of the invention includes providing a system and a method that improve sorbent activity by avoiding or at lest reducing unselectively purging of fresh and highly active sorbent and at the same time limit the circulation of carbon dioxide.

These and further aspects are attained by providing a system and a method in accordance with the accompanying claims.

BRIEF DESCRIPTION OF THE DRAWINGS

Further characteristics and advantages will be more apparent from the description of a preferred but non-exclusive embodiment of the system and method, illustrated by way of non-limiting example in the accompanying drawings, in which:

FIG. 5 represents the situation for the plant schemes of FIG. 2 (curve A) and FIG. 3 (curve B) considering the material flows required to decarbonize cement production using the above mentioned methods;

DETAILED DESCRIPTION

Figure 3:
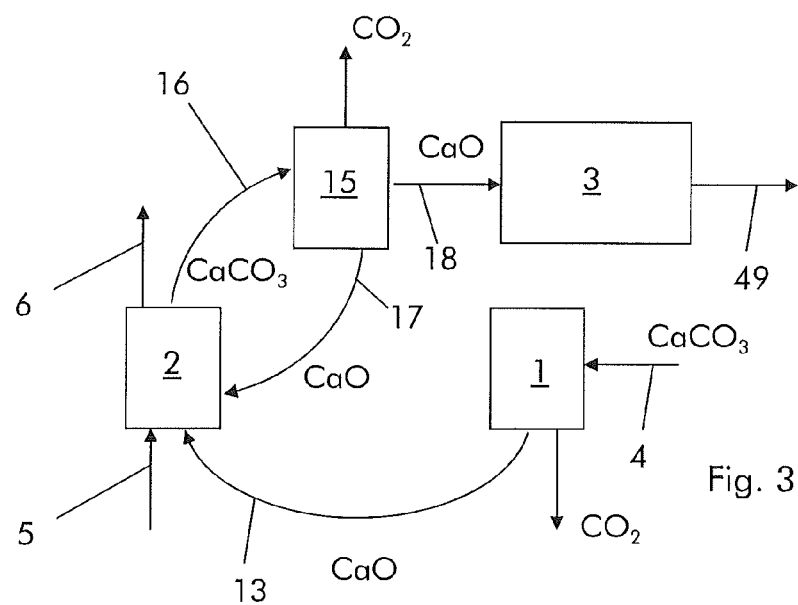
FIG. 3 shows a simplified block flow diagram representing a process scheme for carbon capture coupled with cement production according to the invention.

With reference to FIG. 3, it shows a carbon capture system comprising a first Calciner 1 and a Carbonator 2.

The Carbonator 2 is for adsorbing carbon dioxide from flue gas by employing a lean sorbent in order to generate a more rich sorbent.

The composition of the lean and rich sorbent is dependent on system design and system operational parameters (such as the ratio of make-up flow to recirculation flow) in addition to the deactivation characteristic of the material. For deactivated rich sorbent the mole fraction of $CO_2$ bound to available Ca in the particle is typically less than 0.2(corresponding to between 10 and 20 sorbent cycles in FIG. 6.

In the following reference to CaO as the carbon dioxide lean sorbent and $CaCO_3$ as the carbon dioxide rich sorbent is made; other lean/rich sorbent can anyway be used. In addition it is clear that lean and rich sorbent is not made of only CaO and $CaCO_3$ but they are mixtures including mainly CaO or $CaCO_3$ and other materials; for example the lean sorbent has CaO as the main component, but may also contain $CaCO_3$ and similarly the rich sorbent may also contain CaO.

The first Calciner 1 is for desorbing the carbon dioxide rich sorbent $CaCO_3$ from the carbon dioxide $CO_2$ generating the carbon dioxide lean sorbent CaO.

The first Calciner 1 has a supply 4 of raw material to be calcined and a connection 13 between the first Calciner 1 and the Carbonator 2 for transferring the calcined raw material including the carbon dioxide lean sorbent CaO to the Carbonator 2.

In addition, the system has a second Calciner 15 for desorbing a carbon dioxide rich sorbent $CaCO_3$ from carbon dioxide $CO_2$ generating a carbon dioxide lean sorbent CaO, and connections 16 and 17 between the Carbonator 2 and the second Calciner 15.

The connection 16 between the Carbonator 2 and the second Calciner 15 is for transferring the carbon dioxide rich sorbent $CaCO_3$ to the second Calciner 15, and the connection 17 between the second Calciner 15 and the Carbonator 2 is for transferring carbon dioxide lean sorbent CaO back to the Carbonator 2 for renewed capture of carbon dioxide $CO_2$.

The system can be used in a number of different applications, for this reason the Carbonator 2 can be supplied with flue gas containing carbon dioxide $CO_2$ to be captured and separated from the flue gas.

Preferably, the system is used in a cement production plant; for this reason there are also provided a kiln 3 for cement production and a connection 18 between the second Calciner 15 and the kiln 3 for transferring carbon dioxide lean sorbent CaO to the kiln 3.

Application of the system in a plant for cement production is particularly advantageous because in this case the amount of make-up $CaCO_3$ (supplied with fresh raw material) is very high compared to the amount of purged CaO (forwarded to the kiln). This can be shown with reference to the ratio of make-up molar sorbent flow to the molar sorbent circulation rate, defined by Ratio=Moles of CaO obtained by calcining the make-up sorbent (mainly $CaCO_3$)/Moles of sorbent (mostly CaO) required to capture CO2 from a given flue gas.

Figure 1:
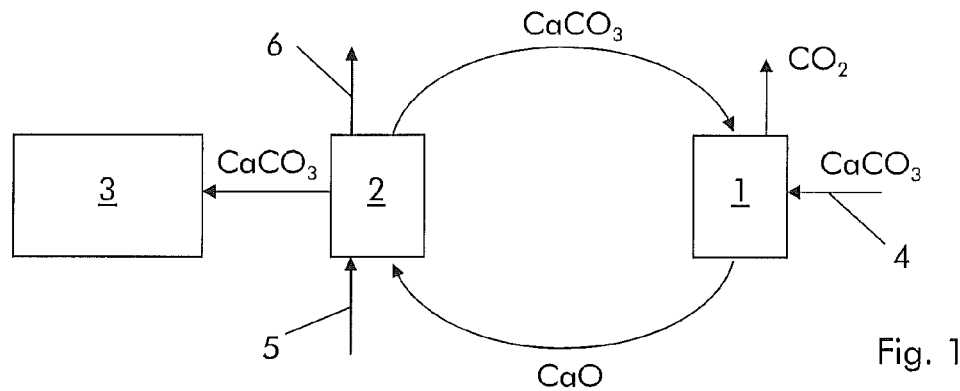
FIGS. 1 and 2 show examples of state of the art process schemes for Carbon capture coupled with cement production.

The ratio is typically above 1 for the schemes described in FIG. 1-2, and is well below 1, typically less than 0.05, for post combustion carbon dioxide capture (for example in power plants or industrial applications). The system provides benefits also for applications to industrially generated flue gas or flue gas from power generation.

Figure 4:
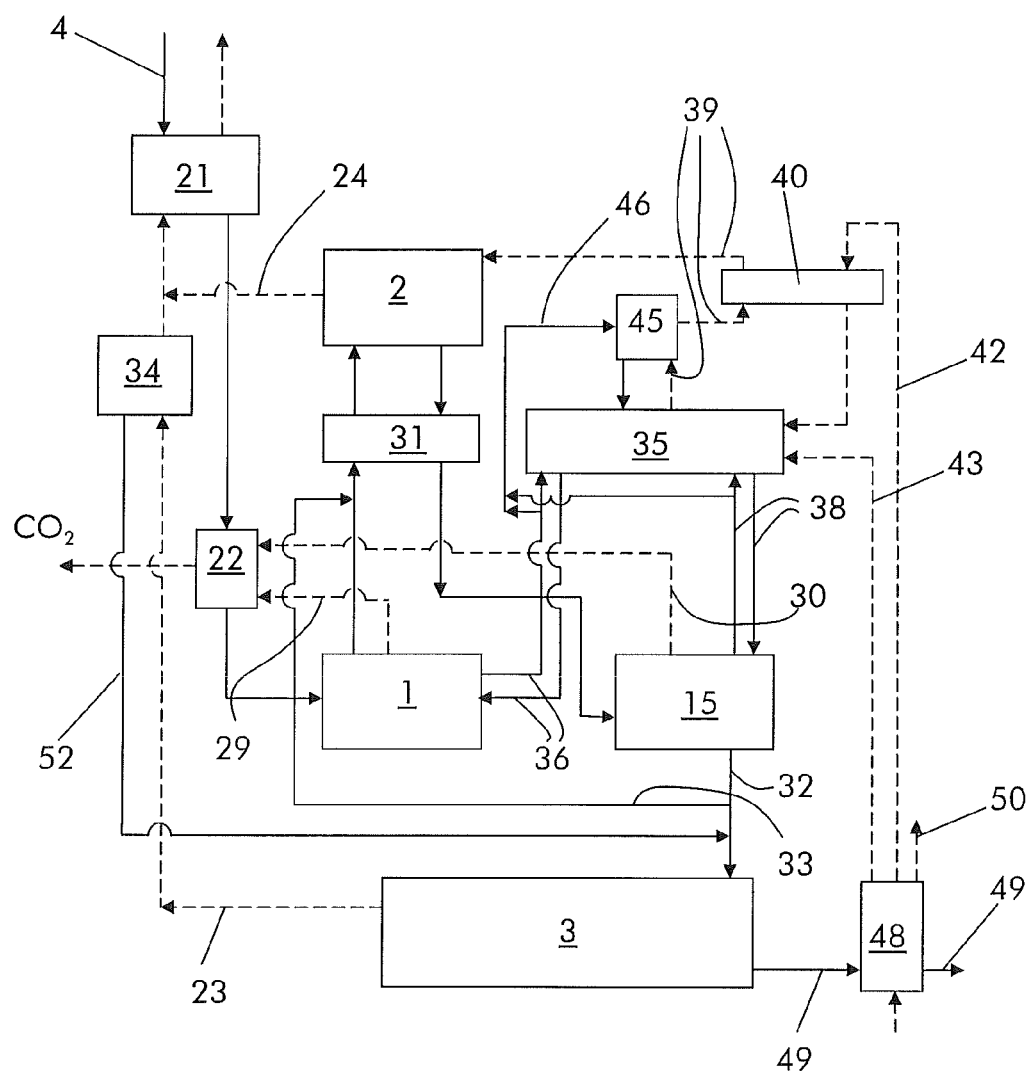
FIG. 4 shows a more detailed block flow diagram of an integrated carbon capture solution for cement production.

FIG. 4 shows the system in more detail; this system can for example be applied as a carbon capture retrofit solution for an existing cement plant; when describing this figure reference to CaO and $CaCO_3$ is made as one of the main components used in cement production and as the preferred sorbent. It is clear that in applications different from cement production the sorbent can be any appropriate natural or synthetic sorbent.

FIG. 4 shows a raw material supply 4 (for e.g. raw meal containing $CaCO_3$) connected to one or more preheaters 21, 22; for example the preheater 21 represents a number of preheaters (for example four or five preheaters from an existing cement plant) for the raw material to be calcined. The preheater 21 heats the raw material by cooling a mixture of carbon dioxide rich flue gas originating from the kiln 3 via a line 23 and carbon dioxide lean flue gas from the Carbonator 2 via a line 24. For example, the kiln gas is bypassed to the preheater 21 of the existing plant to ensure the required operating pressure (under atmospheric pressure, vacuum conditions).

The preheater 22 heats the raw material by cooling the carbon dioxide discharged from the first and second Calciners 1 and 15 via the lines 29, 30.

The preheater 22 is connected to the first Calciner 1 for supplying the raw material (preheated raw material).

Between the first Calciner 1 and the Carbonator 2, a solid/solid heat exchanger 31 is provided, for heating the carbon dioxide rich sorbent $CaCO_3$ moving from the Carbonator 2 to the second Calciner 15 by cooling the carbon dioxide lean sorbent CaO moving from the first Calciner 1 and/or the second Calciner 15 to the Carbonator 2.

The second Calciner 15 is connected with the kiln 3 via the connection 32 and with the Carbonator 2 via the connection 33.

In addition, preferably a separator 34 is provided connected on the line 23, between the kiln 3 and the preheater 21; the separator 34 separates the solid particles possibly contained in the flue gas from the kiln 3 and forwards them back to the kiln 3 via a line 52.

In order to heat the first and second Calciners 1 and 15, a furnace 35 (for example air fired furnace) is provided; the furnace 35 heats solids that are circulated via connection lines 36 between the furnace 35 and the first Calciner 1 and via connection lines 38 between the furnace and the second Calciner 15. Naturally also different schemes are possible for heating the Calciners 1 and 15. For example each Calciner 1, 15 can have a furnace or indirect heat transfer schemes without solids circulation, or direct fired (oxy-fuel) calcination can be implemented.

A connection 39 is provided between the furnace 35 and the Carbonator 2, for supplying flue gas generated in the furnace 35 by combusting a fuel into the Carbonator 2. Preferably, a heat exchanger 40 is provided on the connection 39, for preheating the air (or oxidizer) supplied into the furnace 35 via a line 42 by cooling flue gas discharged from the furnace 35 via the line 39; an additional line 43 can be provided to supply preheated air (or oxidizer, generated from cooling clinker exiting the kiln 3) to the furnace 35, bypassing the heat exchanger 40.

A heat exchanger 45 is also preferentially provided in addition to or in place of the heat exchanger 40, in order to preheat solids supplied via a line 46 to the furnace 35 by cooling the flue gas discharged from the furnace 35 via the line 39. The preheater 45 functions in a counter current manner heating the hot solids which enter at the top via line 46 and fall via gravity through the rising cooling flue gas from furnace 35. The line 46 can originate from the line 36 forwarding solids from the Calciner 1 into the furnace 35 and/or from the line 38 forwarding the solids from the calciner 15 into the furnace 35.

The kiln 3 is connected to a heat exchanger 48 for cooling the clinker 49 discharged from the kiln 3 by heating the fresh oxidizer such as air; the heat exchanger 48 is then connected via the connections 42, 43 to the furnace 35 for supplying the heated air (or oxidizer) into the furnace 35, and via a connection 50 to a fuel drying system, for drying solid fuel such as coal. The fuel drying system is then connected to the furnace 35 and kiln 3 in order to supply the required fuels.

The operation of the system is apparent from that described and illustrated and is substantially the following.

Raw material supply 4 supplies raw material to the preheaters 21 and 22 where it is heated and then supplied to the first Calciner 1. At the first Calciner 1 raw material is calcined (for example raw meal for cement production, it can be different for different applications). Since the raw material supplied to the first Calciner is fresh raw material additional time is required to calcine the sorbent. The Calciner 1 is designed accordingly so that the conversion $CaCO_3$ into CaO is almost complete (i.e. almost all $CaCO_3$ is converted into CaO). This conversion occurs according to the calcination reaction $$CaCO_3 \rightarrow CaO+CO_2$$

usually at a temperature above 900° C., preferably about slightly above 900° C.

The CaO is supplied to the Carbonator 2 where it adsorbs carbon dioxide from the flue gas coming from the furnace 35 (and possibly from flu gas generated in an industrial application or power plant); adsorption takes place according to the reaction $$CaO+CO_2 \rightarrow CaCO_3$$

usually at a temperature between about 600-750° C.

at the heat exchanger 31 CaO moving from the first Calciner 1 to the Carbonator 2 is cooled against rich sorbent $CaCO_3$ moving from the Carbonator 2 to the second Calciner 15; Rich sorbent $CaCO_3$ is thus forwarded to the second Calciner 15.

At the second Calciner 15 carbon dioxide is released by thermal decomposition according to the calcination reaction $$CaCO_3 \rightarrow CaO+CO_2$$

usually at a temperature above 900° C., preferably about slightly above 900° C.

CaO is thus supplied to the kiln 3 via the line 32 and partly to the Carbonator 2 via the line 33.

Since at the Carbonator 2 there is a large amount of CaO coming from the first Calciner 1 (this is fresh CaO) and the amount of CaO from the second Calciner 15 is limited (because CaO is only purged from the second Calciner 15), the carbonation reaction at the Carbonator 2 is very efficient and the CaO can adsorb a large amount of carbon dioxide.

Figure 2:
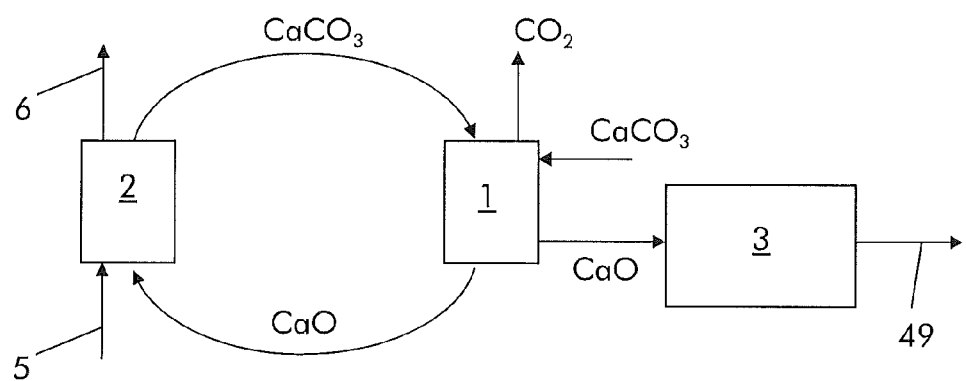
Figure 5:
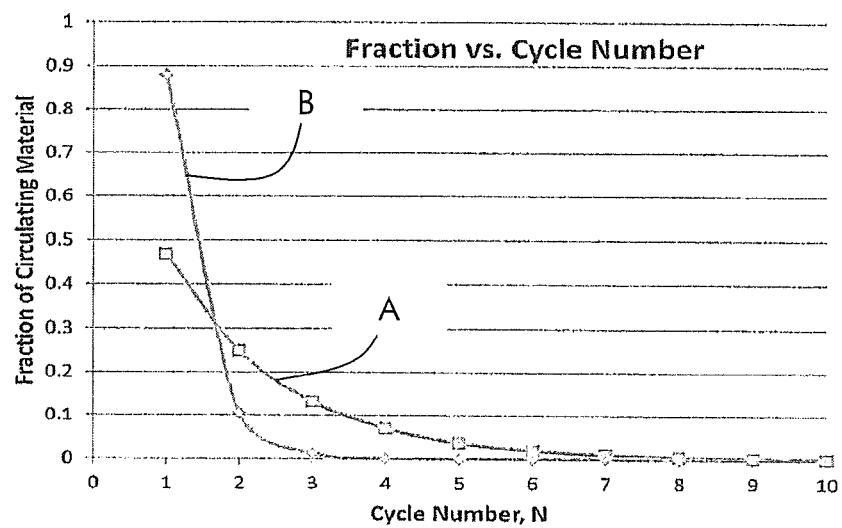
FIG. 5 is diagram showing the fraction of sorbent in the system having completed a given number of calcination and recarbonation cycles.

FIG. 5 shows the cycles that the CaO has undergone in a system according to FIG. 2 (curve A) and according to FIGS. 3 and 4 (curve B). This figure shows that according to the invention (FIGS. 3 and 4) the CaO supplied to the Carbonator 2 undergoes less calcination/carbonation cycles and is therefore more reactive.

Figure 6:
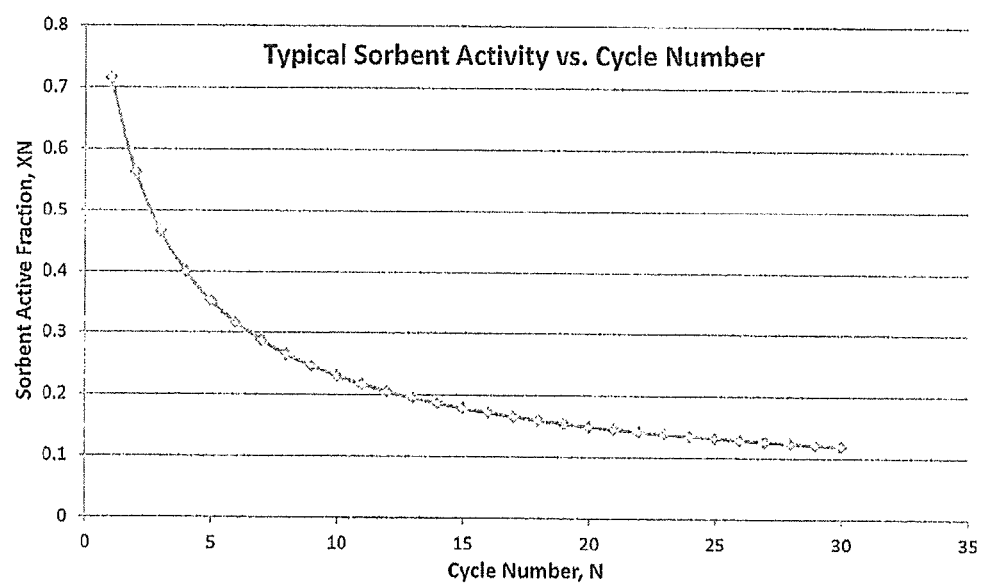
FIG. 6 is a diagram showing the reduction of sorbent activity with an increasing number of calcination and recarbonation cycles.

Considering the decline in the activity of the sorbent according to FIG. 6, the method of the invention provides an increased active fraction of circulating sorbent for the same sorbent molar flow (molar flow of CaO and $CaCO_3$). Considering the make-up rate of fresh sorbent (required for cement production), the method shown in FIG. 3 increases sorbent activity (mol $CaCO_3$/mol CaO and $CaCO_3$ in the sorbent) by between 5 to 20%, typically above 10%. Ultimately this translates into a lower required sorbent circulation rate or smaller equipment.

The furnace 35 combusts a fuel and generates hot solids that are circulated via lines 36 and 38 between the furnace 35 and the first and second Calciners 1 and 15. Preferably a part of the cooled solids returning from the Calciners (1 or 15) is diverted via the line 46 to be heated against flue gas discharged from the furnace 35 in the heat exchanger 45. The flue gas discharged from the furnace 35 is supplied into the Carbonator 2 (for carbon dioxide capture) after cooling via the heat exchangers 45 and 40.

The carbon dioxide rich flue gas from the kiln 3 is supplied to the separator 34 via the line 23, where solid particles are separated from the gas and forwarded back to the kiln 3 via the line 52.

The present invention also refers to a method for capturing carbon dioxide.

The method comprises supplying a raw material containing a carbon dioxide rich sorbent such as $CaCO_3$ (but other sorbents are possible, $CaCO_3$ is preferably used when the method is implemented in connection with a kiln for cement production) into a first Calciner 1. At the first Calciner 1, the raw material is calcined according to the calcination (decarbonation reaction)

$$CaCO_3 \rightarrow CaO+CO_2$$

that usually takes place at a temperature above 900° C., preferably about slightly above 900° C.

Following the calcination reaction, a calcined raw material containing a carbon dioxide lean sorbent CaO is generated; in addition, also carbon dioxide is generated.

The calcined raw material containing the carbon dioxide lean sorbent CaO is supplied to the Carbonator 2. In addition, also flue gas is supplied into the Carbonator 2; the flue gas comes from the furnace 35, but in other applications can also come from an industrial process or a furnace of a power plant for electricity production.

At the Carbonator 2, carbon dioxide from flue gas is adsorbed by the carbon dioxide lean sorbent CaO according to the carbonation reaction $$CaO+CO_2 \rightarrow CaCO_3$$

that takes place at a temperature between about 600-750° C.

Following the carbonation reaction, a raw material containing a carbon dioxide rich sorbent $CaCO_3$ is generated.

The raw material containing carbon dioxide rich sorbent, namely $CaCO_3$, is in turn supplied to the second Calciner 15.

At the second Calciner 15, the raw material containing carbon dioxide rich sorbent $CaCO_3$ is calcined according to the calcination (decarbonation reaction)

$$CaCO_3 \rightarrow CaO + CO_2$$

that usually takes place at a temperature above 900° C., preferably about slightly above 900° C.

Following the calcination reaction, calcined raw material containing carbon dioxide lean sorbent CaO and carbon dioxide are generated.

A part of the calcined raw material containing carbon dioxide lean sorbent CaO is supplied to the Carbonator 2.

When the method is used in connection with a kiln for cement production (preferred application) a part of the calcined raw material containing carbon dioxide lean sorbent CaO is transferred from the second Calciner 15 to the kiln 3 for cement production.

The additional Calciner 15 provides increased flexibility to consider increased calcination times ensuring complete calcination of make-up sorbent and ultimately increasing the sorbent activity (quantity $CO_2$/quantity sorbent).

Naturally the features described may be independently provided from one another.

In practice the materials used and the dimensions can be chosen at will according to requirements and to the state of the art.

The invention claimed is:

1. A carbon capture system comprising:
   a Carbonator configured to adsorb carbon dioxide using a first fresh carbon dioxide lean sorbent and a second purged carbon dioxide lean sorbent to generate a carbon dioxide rich sorbent;
   a supply of raw material containing a carbon dioxide rich sorbent;
   a first Calciner configured to calcine the supply of raw material to provide the first fresh carbon dioxide lean sorbent and a first carbon dioxide stream;
   a first input to the Carbonator configured to receive at least the first fresh carbon dioxide lean sorbent from the first Calciner;
   a second Calciner configured to thermally decompose a carbon dioxide rich sorbent into the second purged carbon dioxide lean sorbent and a second carbon dioxide stream;
   a second input to the Carbonator configured to receive the second purged carbon dioxide lean sorbent from the second Calciner; and
   a first output from the Carbonator configured to transfer at least the carbon dioxide rich sorbent to the second Calciner.

2. The carbon capture system of claim 1, further comprising:
   a kiln for cement production;
   a connection between the second Calciner and the kiln for transferring the second purged carbon dioxide lean sorbent to the kiln.

3. The carbon capture system of claim 1, further comprising a preheater for a first raw material and a second raw material to be calcined.

4. The carbon capture system of claim 1, further comprising a solid/solid heat exchanger for heating the carbon dioxide rich sorbent moving from the Carbonator to the second Calciner by cooling the first fresh carbon dioxide lean sorbent moving from the first Calciner, to the Carbonator and the second purged carbon dioxide lean sorbent moving from the second Calciner, to the Carbonator.

5. The carbon capture system of claim 2, further comprising a heat exchanger for cooling clinker discharged from the kiln by heating fresh oxidizer, and at least a connection of the heat exchanger to at least one of:
   a furnace, for supplying the heated oxidizer into the furnace; and
   a fuel drying system.

6. The carbon capture system of claim 5, wherein at least one of the connections to the furnace is provided with a heat exchanger for preheating the oxidizer supplied into the furnace by cooling flue gas discharged from the furnace.

* * * * *